United States Patent
Choudhary et al.

(10) Patent No.: US 10,740,284 B1
(45) Date of Patent: Aug. 11, 2020

(54) TECHNIQUES FOR EFFICIENTLY PERFORMING FILESYSTEM REORGANIZATION TASKS FOR DIFFERENT FILESYSTEMS

(71) Applicant: EMC IP Holding Company LLC, Hopkinton, MA (US)

(72) Inventors: Gyanesh Kumar Choudhary, Edison, NJ (US); Alexander S. Mathews, Morganville, NJ (US); Ruiling Dou, Shanghai (CN); Chang Yong Yu, Shanghai (CN); Yuetao Jiang, Shanghai (CN); Philippe Armangau, Acton, MA (US); Xianlong Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 896 days.

(21) Appl. No.: 15/394,601

(22) Filed: Dec. 29, 2016

(51) Int. Cl.
*G06F 9/50* (2006.01)
*G06F 16/11* (2019.01)
*G06F 16/10* (2019.01)

(52) U.S. Cl.
CPC .............. *G06F 16/11* (2019.01); *G06F 9/505* (2013.01); *G06F 16/10* (2019.01)

(58) Field of Classification Search
CPC .................................. G06F 16/10; G06F 9/505
See application file for complete search history.

(56) References Cited

U.S. PATENT DOCUMENTS

| | | | |
|---|---|---|---|
| 6,339,793 B1 * | 1/2002 | Bostian | G06F 16/10 |
| | | | 709/229 |
| 6,976,072 B2 * | 12/2005 | Mathieson | G06F 9/5027 |
| | | | 709/223 |
| 8,327,103 B1 | 12/2012 | Can et al. | |
| 9,003,129 B1 | 4/2015 | Harvey et al. | |

(Continued)

OTHER PUBLICATIONS

Philippe Armangau, et al.; "Adaptive Thread Processing of IO Requests," U.S. Appl. No. 15/086,647, filed Mar. 31, 2016.

(Continued)

*Primary Examiner* — Apu M Mofiz
*Assistant Examiner* — Sheryl L Holland
(74) *Attorney, Agent, or Firm* — BainwoodHuang

(57) ABSTRACT

A method includes (a) while processing data storage requests from users directed to filesystems of a plurality of filesystems served from a data storage system, receiving a request to execute a filesystem reorganization task on a filesystem of the plurality of filesystems, (b) in response to receiving the request, checking whether the filesystem reorganization task has both a global reorganization token and a filesystem-specific reorganization token, the filesystem-specific reorganization token being specific to the filesystem on which the filesystem reorganization task has been requested to execute, and (c) in response to determining that the filesystem reorganization task does have both the global reorganization token and the filesystem-specific reorganization token, executing the filesystem reorganization task to move a data block from one location within the filesystem to another location within the filesystem. Other embodiments (Continued)

are directed to corresponding apparatuses, computer program products, and systems for performing similar methods.

15 Claims, 5 Drawing Sheets

(56) References Cited

U.S. PATENT DOCUMENTS

| | | |
|---|---|---|
| 9,146,921 B1 | 9/2015 | Vempati et al. |
| 9,378,052 B1 | 6/2016 | Dou et al. |
| 9,400,741 B1 | 7/2016 | Bono et al. |
| 9,430,492 B1 | 8/2016 | Bono et al. |
| 9,916,191 B1 | 3/2018 | Pan et al. |
| 9,933,945 B1 | 4/2018 | Mao et al. |
| 9,965,201 B1 | 5/2018 | Bono et al. |
| 10,013,217 B1 | 7/2018 | Bono et al. |
| 2009/0168793 A1* | 7/2009 | Fox .................. H04L 47/521 370/412 |
| 2012/0311606 A1* | 12/2012 | Marathe .............. G06F 9/526 718/107 |
| 2014/0059310 A1* | 2/2014 | Du .................. G06F 3/065 711/162 |
| 2016/0308769 A1* | 10/2016 | VerSteeg ............ H04L 47/12 |
| 2017/0308406 A1* | 10/2017 | Kusters .............. G06F 9/5011 |
| 2018/0210650 A1 | 7/2018 | Alexeev et al. |

OTHER PUBLICATIONS

Dmitry Vladimirovich Krivenok, et al.; "Techniques for Scheduling Storage Operations on Virtual Disks of a Virtual Machine," U.S. Appl. No. 15/195,447, filed Jun. 28, 2016.

Yaming Kuang et al.; "Recovering Compressed Data to Reduce Data Loss," U.S. Appl. No. 15/395,968, filed Dec. 30, 2016.

* cited by examiner

TECHNIQUES FOR EFFICIENTLY PERFORMING FILESYSTEM REORGANIZATION TASKS FOR DIFFERENT FILESYSTEMS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines, which specify files or other data elements to be written, read, created, deleted, etc. Software running on the storage processors manages incoming storage requests and performs various data processing tasks to organize and secure the data elements stored on the non-volatile storage devices. Filesystems are generally built upon volumes. In some data storage systems, slices of data storage may be provisioned to a volume that supports a filesystem on an as-needed basis. As is known, slices are uniformly-sized storage extents, which may be 256 megabytes (MB) or 1 gigabyte (GB), for example. When a filesystem requires additional storage space to accommodate incoming writes, a data storage system may provide the additional space by provisioning another slice to the volume that backs the filesystem.

It sometimes happens that, after space is provisioned to a volume that supports a filesystem, contents may be deleted, reducing the actual space used by the filesystem. This may result in more storage being provisioned to the underlying volume than is necessary. Thus, a filesystem shrink process may attempt to clear one slice allocated to the volume by moving all blocks of data from that slice to other slices that have unused space. In addition, space within a single slice may become fragmented after use. Thus, a filesystem consolidation process may attempt to reorganize the blocks within that slice to create large contiguous extents of free space. In order to avoid having filesystem shrink processes and filesystem consolidation processes (together referred to as filesystem reorganization processes) proliferate and take resources away from fulfillment of data storage requests, some data storage systems institute techniques to limit the number of running filesystem reorganization processes.

SUMMARY

Unfortunately, although some systems are able to prevent too many filesystem reorganization processes from executing at once in order to avoid slowing down fulfillment of data storage requests, it is possible for one greedy filesystem to run so many filesystem reorganization processes or to take so long to run each one, that other filesystems may become starved for resources. The combination of a limit on simultaneous filesystem reorganization processes within a data storage system and one or more greedy or slow filesystems can cause other filesystems to not be able to run filesystem reorganization processes.

Thus, it would be desirable to implement techniques to efficiently allocate processing resources between filesystem reorganization processes from different filesystems to prevent a slow or greedy filesystem from starving out filesystem reorganization processes on other filesystems. In contrast with the prior approaches, which may suffer from inefficiencies, improved techniques schedule filesystem reorganization tasks by requiring a filesystem reorganization task to have both a global token and a filesystem-specific token in order to execute. Since each filesystem is only allocated a limited number of filesystem-specific tokens in comparison to the number of global tokens, no filesystem can dominate the rest too strongly. Further improvements can dynamically reallocate fewer filesystem-specific tokens to filesystems that are too slow to further prevent starvation of filesystem reorganization processes on other filesystems. In addition, a specialized queue and dequeueing procedure can be implemented to allow for fairness in scheduling of filesystem reorganization tasks.

One embodiment is directed to a method, performed by a data storage system. The method includes (a) while processing data storage requests from users directed to filesystems of a plurality of filesystems served from the data storage system, receiving a request to execute a filesystem reorganization task on a filesystem of the plurality of filesystems, (b) in response to receiving the request, checking whether the filesystem reorganization task has both a global reorganization token and a filesystem-specific reorganization token, the filesystem-specific reorganization token being specific to the filesystem on which the filesystem reorganization task has been requested to execute, and (c) in response to determining that the filesystem reorganization task does have both the global reorganization token and the filesystem-specific reorganization token, executing the filesystem reorganization task to move a data block from one location within the filesystem to another location within the filesystem. Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

Embodiments are directed to techniques to efficiently allocate processing resources between filesystem reorganization processes from different filesystems to prevent a slow or greedy filesystem from starving out filesystem reorganization processes on other filesystems. In contrast with the prior approaches, which may suffer from inefficiencies, improved techniques schedule filesystem reorganization tasks by requiring a filesystem reorganization task to have both a global token and a filesystem-specific token in order to execute. Since each filesystem is only allocated a limited number of filesystem-specific tokens in comparison to the number of global tokens, no filesystem can dominate the rest too strongly. Further improvements can dynamically reallocate fewer filesystem-specific tokens to filesystems that are too slow to further prevent starvation of filesystem reorganization processes on other filesystems. In addition, a specialized queue and dequeueing procedure can be implemented to allow for fairness in scheduling of filesystem reorganization tasks.

Figure 1:
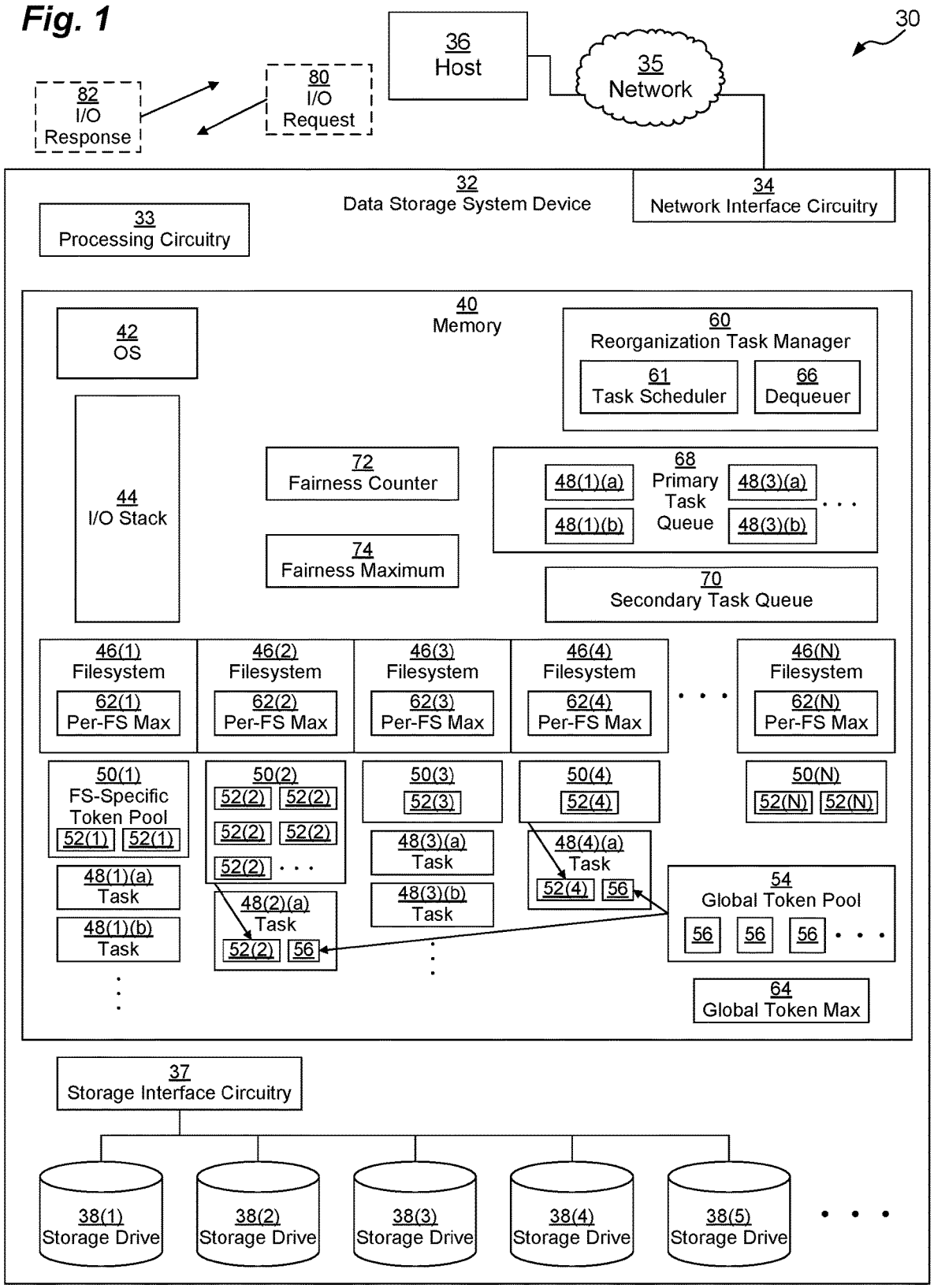
FIG. 1 is a block diagram depicting an example system and apparatus for use in connection with various embodiments.

FIG. 1 shows an example environment 30 in which embodiments of the improved techniques hereof can be practiced. Here, one or more host computing devices 36 access a data storage system (DSS) device 32 over a network 35. The data storage system 32 includes processing circuitry 33, network interface circuitry 34, storage interface circuitry 37, a set of storage drives 38 (depicted as storage drives 38(1), 38(2), 38(3), 38(4), 38(5), . . . ), and memory 40.

In an example, the storage drives 38 may be arranged into one or more RAID groups (not depicted) where each RAID group is composed of multiple storage drives 38. The storage drives 38 may include magnetic disk drives, electronic flash drives, optical drives, and/or other types of persistent storage.

The network 35 may be any type of network or combination of networks, such as a storage area network (SAN), a local area network (LAN), a wide area network (WAN), the Internet, and/or some other type of network or combination of networks, for example. The hosts 36 may connect to the DSS device 32 using various technologies, such as Fibre Channel, iSCSI, NFS, SMB 3.0, and CIFS, for example. Any number of hosts 36 may be provided, using any of the above protocols, some subset thereof, or other protocols besides those shown. The DSS device 32 is configured to receive I/O (input/output) requests 80 according to standardized protocols and to respond to such I/O requests by reading or writing to the storage drives 38 and providing an I/O response 82 back to the initiating host 36.

Network interface circuitry 34 is configured to connect to network 35. Network interface circuitry 34 may include, for example, a SCSI target adapter or network interface adapters for converting electronic and/or optical signals received over the network 35 to electronic form for use by processing circuitry 33.

Processing circuitry 33 may be any kind of processor or set of processors configured to perform operations, such as, for example, one or more microprocessors, multi-core microprocessors, digital signal processors, systems on a chip, collections of electronic circuits, similar kinds of controllers, or any combination of the above.

The storage interface circuitry 37 may include, for example, SCSI adapters and other disk interface adapters (e.g., SAS, ATA, SATA, Fibre Channel, etc.) for communicating between the storage drives 38 and the processing circuitry 33 or memory 40.

The DSS device 32 may include multiple storage processors (not depicted). Each storage processor may include its own instance of the processing circuitry 33, network interface circuitry 34, storage interface circuitry 37, and memory 40. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

Memory 40 may be any kind of digital system memory, such as, for example, random access memory (RAM). Memory 40 stores one or more operating systems (OSes) 42 in operation (e.g., Linux, UNIX, Windows, MacOS, or a similar operating system), an I/O driver stack 44 (which includes various storage drivers not depicted), and a reorganization task manager 60 executing on processing circuitry 33 and various associated data structures. Memory 40 may also store various other applications (not depicted) executing on processing circuitry 33.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS device 32 is powered off. The OS 42 and the applications and drivers are typically stored in this persistent storage portion of memory 40 or in persistent storage 44 so that they may be loaded into a system portion of memory 40 from this persistent storage portion of memory 40 or persistent storage 44 upon a system restart. These applications and drivers, when stored in non-transient form either in the volatile portion of memory 40 or in persistent storage 44 or in persistent portion of memory 40, form a computer program product. The processing circuitry 33 running one or more of these applications or drivers thus forms a specialized circuit constructed and arranged to carry out the various processes described herein.

Memory 40 also stores representations of various filesystems 46 (depicted as filesystems 46(1), 46(2), 46(3), 46(4), . . . , 46(N)) provided by storage drives 38. Each filesystem 46 may have associated filesystem reorganization tasks 48 (e.g., filesystem shrink tasks and/or filesystem consolidation tasks) that are pending or currently executing. For example, as depicted, filesystem reorganization tasks 48(1)(a), 48(1)(b) are associated with filesystem 46(1) (i.e., they involve moving a data block of filesystem 46(1) from one location to another as part of a consolidation or shrink operation), filesystem reorganization task 48(2)(a) is associated with filesystem 46(2), filesystem reorganization tasks 48(3)(a), 48(3)(b) are associated with filesystem 46(3), and filesystem reorganization task 48(4)(a) is associated with filesystem 46(4).

Each filesystem 46 also has an associated filesystem-specific token pool 50 (depicted as filesystem-specific token pools 50(1), 50(2), 50(3), 50(4), . . . , 50(N)). Each filesystem-specific token pool 50 stores a set of (zero or more) available filesystem-specific tokens 52. Each filesystem-specific token pool 50 stores no more than the per-filesystem maximum 62 number of filesystem-specific tokens 52.

As depicted, the per-filesystem maximum 62(1) number of filesystem-specific tokens 52(1) for filesystem 46(1) is two, and they are both available in filesystem-specific token pool 50(1). Similarly, the per-filesystem maximum 62(3) number of filesystem-specific tokens 52(3) for filesystem 46(3) is at least one (which is available in filesystem-specific token pool 50(3)), and the per-filesystem maximum 62(N) number of filesystem-specific tokens 52(N) for filesystem 46(N) is two (which are both available in filesystem-specific token pool 50(N)).

As depicted, the per-filesystem maximum 62(2) number of filesystem-specific tokens 52(2) for filesystem 46(2) is at least six, and at least five are available in filesystem-specific token pool 50(2), but one filesystem-specific token 52(2) has been assigned to filesystem reorganization task 48(2)(*a*). Filesystem reorganization task 48(2)(*a*) also has an assigned global token 56. Since filesystem reorganization task 48(2)(*a*) has both a filesystem-specific tokens 52(2) and a global token 56, filesystem reorganization task 48(2)(*a*) is now executing.

As depicted, the per-filesystem maximum 62(4) number of filesystem-specific tokens 52(4) for filesystem 46(4) is two, and one is available in filesystem-specific token pool 50(4), but one filesystem-specific token 52(4) has been assigned to filesystem reorganization task 48(4)(*a*). Filesystem reorganization task 48(4)(*a*) also has an assigned global token 56. Since filesystem reorganization task 48(4)(*a*) has both a filesystem-specific tokens 52(4) and a global token 56, filesystem reorganization task 48(4)(*a*) is now executing.

Since filesystem reorganization tasks 48(1)(*a*), 48(1)(*b*), 48(3)(*a*), and 48(3)(*a*) do not have both a filesystem-specific token 52 and a global token 56, filesystem reorganization tasks 48(1)(*a*), 48(1)(*b*), 48(3)(*a*), and 48(3)(*a*) are pending. These filesystem reorganization tasks 48(1)(*a*), 48(1)(*b*), 48(3)(*a*), and 48(3)(*a*) are also part of a primary task queue 68. Primary task queue 68 stores pending filesystem reorganization tasks 48 (or references thereto) for intelligent dequeueing by dequeuer module 66 of reorganization task manager 60.

In some embodiments, memory 40 also includes one or more secondary task queues 70. In such embodiments, secondary task queues 70 have lower dequeueing priorities than primary task queue 68. Thus, dequeuer module 66 may first attempt to dequeue a task 48 from primary task queue 68, and then, if no tasks 48 are available for dequeueing from primary task queue 68, dequeuer module 66 may then attempt to dequeue a task 48 from one of secondary task queues 70. In some embodiments, in order to avoid starving the secondary task queues 70, memory 40 may also store a fairness counter 72 and a fairness maximum 74. Thus, for example, a fairness maximum 74 may be set to a value of ten, while the fairness counter 72 may be initialized to a value of ten. Every time a task 48 is dequeued from primary task queue 68, dequeuer module 66 decrements the fairness counter 72 until it reaches zero. The next time dequeuer module 66 attempts to dequeue a task 48, because the fairness counter 72 is at zero, it will instead first attempt to dequeue a task 48 from a secondary queue 70. Once it is able to do so, dequeuer module 66 resets the fairness counter 72 to equal the fairness maximum. In some embodiments, dequeuer module 66 equivalently increments fairness counter 72 from an initial value of zero until it reaches the fairness maximum 74.

In some embodiments, certain kinds of filesystem reorganization tasks 48 are placed into primary task queue 68, while other kinds of filesystem reorganization tasks 48 are placed into secondary task queue 70. For example, in one embodiment, filesystem consolidation tasks are placed into primary task queue 68, while filesystem shrink tasks are placed into secondary task queue 70. In another embodiment, filesystem consolidation tasks are initially placed into primary task queue 68, while filesystem shrink tasks are placed into secondary task queue 70; however, upon an amount of free storage within storage drives 38 decreasing below a threshold amount, the queues 68, 70 are swapped, and filesystem shrink tasks are subsequently placed into primary task queue 68, while filesystem consolidation tasks are placed into secondary task queue 70 until the amount of free storage within storage drives 38 increases sufficiently.

Memory 40 also stores a global token pool 54, which stores a set of (zero or more) available global tokens 56. Global token pool 54 stores no more than the global maximum 64 number of global tokens 56.

In operation, whenever a filesystem reorganization background process for a particular filesystem 46(*x*) wants to move blocks within that filesystem 46(*x*), it initiates a filesystem reorganization task 48(*x*)(*y*) and attempts to obtain a filesystem-specific token 52(*x*) from the pool 50(*x*) for that filesystem 46(*x*) as well as a global token 56 from global token pool 54. If it is able to obtain both tokens 52(*x*), 56, then that filesystem reorganization task 48(*x*)(*y*) executes. If not, task scheduler module 61 places that filesystem reorganization task 48(*x*)(*y*) on the queue 68 (or on the appropriate queue 68, 70 if there are multiple queues) to wait for dequeueing by dequeuer module 66. The next time any task 48 finishes executing, if there are any pending tasks 48 on a queue 68, 70, then dequeuer module 66 frees the filesystem-specific token 52 from the task 48 that just completed, and it then attempts to dequeue a task 48 from primary queue 68 (or secondary queue 70 if the fairness counter 72 value is appropriate). In some embodiments, primary queue 68 may be a simple first-in-first-out queue. In other embodiments, primary queue 68 may be more complex (see below at FIG. 3). In any event, dequeuer module 66 only dequeues a task 48 from a queue 68, 70 if that task 48 is able to obtain a filesystem-specific token 52 from the pool 50 for the filesystem 46 associated with that task 48.

Figure 2:
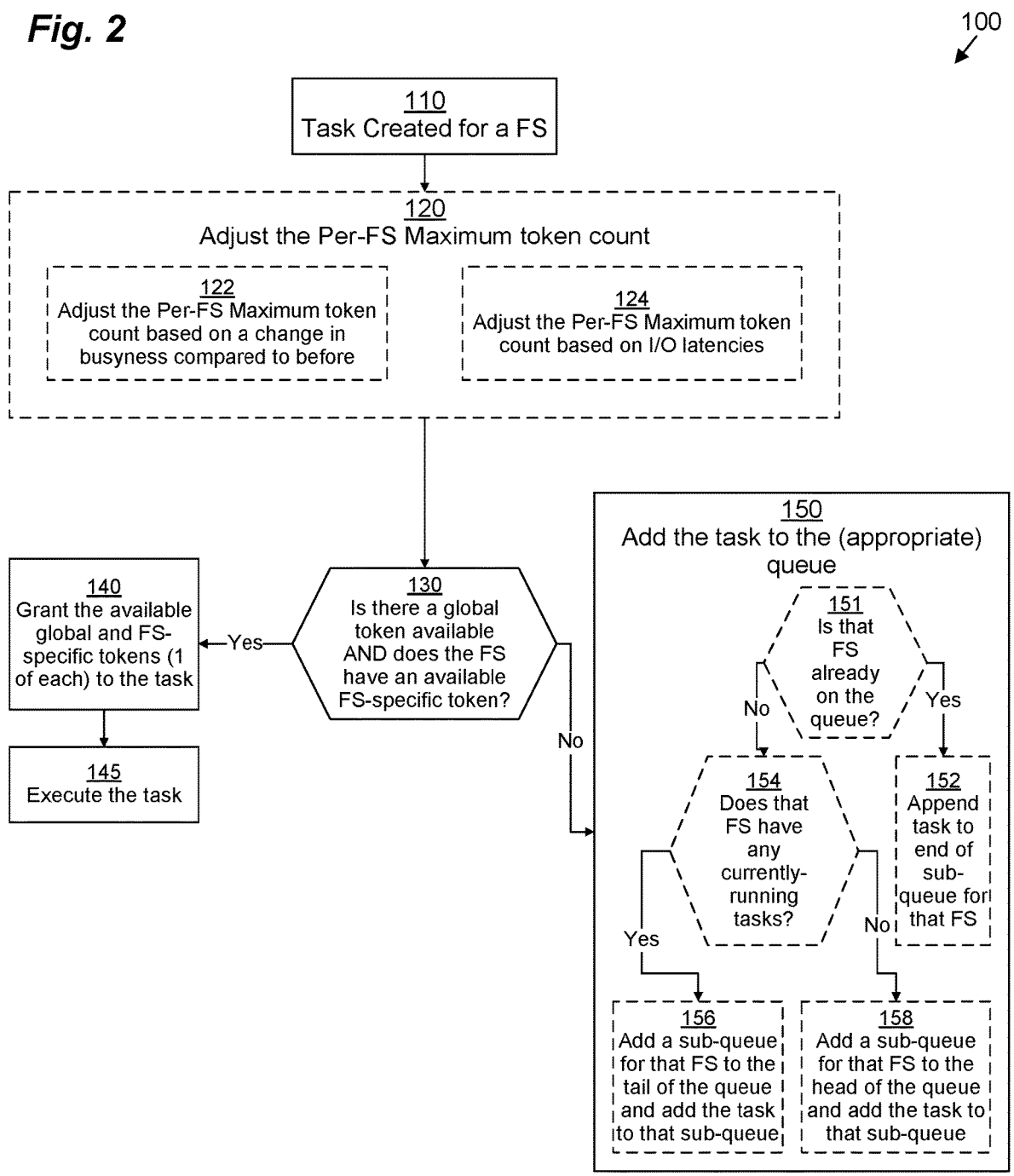
FIG. 2 is a flowchart depicting example methods of various embodiments.

FIG. 2 illustrates an example method 100 performed by task scheduler module 61 of reorganization task manager 60 for selectively scheduling or queueing a filesystem reorganization task 48. It should be understood that any time a piece of software (e.g., reorganization task manager 60, task scheduler module 61, dequeuer module 66, etc.) is described as performing a method, process, step, or function, in actuality what is meant is that a computing device (e.g., DSS device 32) on which that piece of software is running performs the method, process, step, or function when executing that piece of software on its processing circuitry 33.

It should be understood that, within FIG. 2, certain steps and sub-steps are drawn with a dashed border because they may be considered optional, depending on the embodiment, or they may represent various alternative scenarios in which method 100 may be employed. In addition, one or more of the other steps or sub-steps of method 100 may also be omitted in some embodiments. Similarly, in some embodiments, one or more steps or sub-steps may be combined together or performed in a different order. Method 100 is performed by DSS device 32. More specifically, method 100 is performed by reorganization task manager 60 (largely by its task scheduler module 61 component) running on DSS device 32 in combination with other components of DSS device 32.

In step 110, a filesystem reorganization process running on filesystem 46(*x*) creates a filesystem reorganization task 48(*x*)(*y*).

In some embodiments, reorganization task manager 60 then performs optional step 120. In step 120, reorganization task manager 60 adjusts the per-filesystem maximum 62(*x*) number of filesystem-specific tokens 52(*x*) available to that filesystem 46(*x*). In one embodiment, reorganization task manager 60 performs step 120 via sub-step 122, while in another embodiment, reorganization task manager 60 performs step 120 via sub-step 124.

In sub-step 122, reorganization task manager 60 adjusts the per-filesystem maximum 62(*x*) number of filesystem-specific tokens 52(*x*) available to that filesystem 46(*x*) based on a change in the busyness of that filesystem 46(*x*) compared to at a previous time. The "busyness" of a filesystem 46(x) is a measure of how many I/O requests that filesystem 46(x) processes per unit time (e.g., I/Os per second or IOPS). In some embodiments, reorganization task manager 60 compares how many IOPS the filesystem 46(x) measures at step 122 compared to how many IOPS the filesystem 46(x) measured at a previous time that step 122 was performed for that filesystem 46(x). In one embodiment, if the new per-filesystem maximum 62(x) is $M_{new}$, the previous per-filesystem maximum 62(x) is $M_{old}$, the previous measure of filesystem busyness for that filesystem 46(x) in IOPS is $B_{old}$, the current measure of filesystem busyness for that filesystem 46(x) in IOPS is $B_{new}$, and A is a constant, then the new per-filesystem maximum 62(x) may be calculated according to the following formula:

$$M_{new}=M_{old}+A(B_{new}-B_{old}).$$

Thus, if $M_{old}$ is 10 tokens, $B_{new}$ is 6,000 IOPS, $B_{old}$ is 5,000 IOPS, and A is 0.0017, then $M_n$ is 11.7 tokens, which rounds up to 12 tokens.

In sub-step 124, reorganization task manager 60 adjusts the per-filesystem maximum 62(x) number of filesystem-specific tokens 52(x) available to that filesystem 46(x) based on a measure of I/O latency of that filesystem 46(x). Thus, for example, in one embodiment, if the I/O latency is in the range of 0-10 ms, then the per-filesystem maximum 62(x) may be set to 24 tokens, while if the I/O latency is in the range of 40-50 ms, then the per-filesystem maximum 62(x) may be set to 10 tokens, and if the I/O latency exceeds 100 ms, then the per-filesystem maximum 62(x) may be set to 1 token, computed according to a table. In some embodiments, there may be a separate per-filesystem maximum 62(x) for different types of filesystem reorganization tasks 48. In some of these embodiments, the tables for converting I/O latency to per-filesystem maximum 62(x) for the different types of filesystem reorganization tasks 48 may swap, depending on system usage (e.g., when free space on storage drives 38 drops below 10%; when space usage on filesystem 46(x) increases above 85% of a maximum filesystem size for filesystem 46(x); etc. Thus, in one example embodiment, Table 1 may be used to calculate the per-filesystem maximum 62(x) number of filesystem-specific tokens 52(x) available to that filesystem 46(x) based on a measure of I/O latency of that filesystem 46(x):

TABLE 1

| I/O Latency | Max FS-Specific Tokens for FS consolidation (FS Shrink if space usage exceeds 85% of FS size) | Max FS-Specific Tokens for FS Shrink (FS consolidation if space usage exceeds 85% of FS size) |
| --- | --- | --- |
| 0-10 ms | 24 | 16 |
| 10-20 ms | 20 | 12 |
| 20-30 ms | 16 | 10 |
| 30-40 ms | 12 | 8 |
| 40-50 ms | 10 | 7 |
| 50-60 ms | 8 | 6 |
| 60-70 ms | 6 | 5 |
| 70-80 ms | 4 | 4 |
| 80-90 ms | 3 | 3 |
| 90-100 ms | 2 | 2 |
| >100 ms | 1 | 1 |

In step 130, task scheduler module 61 determines whether or not both a global token 56 is available from the global token pool 54 and a filesystem-specific token 52(x) is available from the filesystem-specific token pool 50(x) for that filesystem 46(x). If so, operation proceeds with step 140. Otherwise, operation proceeds with step 150.

In step 140, task scheduler module 61 grants both the global token 56 available from the global token pool 54 and the filesystem-specific token 52(x) available from the filesystem-specific token pool 50(x) to the filesystem reorganization task 48(x)(y). Then, in step 145, task scheduler module 61 schedules the filesystem reorganization task 48(x)(y) for execution without delay.

Alternatively, in step 150, task scheduler module 61 adds the filesystem reorganization task 48(x)(y) to a queue 68, 70. In embodiments in which there is only one task queue 68, task scheduler module 61 adds the filesystem reorganization task 48(x)(y) to a queue 68. In embodiments in which there are more than one task queues 68, 70, task scheduler module 61 adds the filesystem reorganization task 48(x)(y) to the appropriate queue 68, 70 (e.g., if filesystem reorganization task 48(x)(y) is a filesystem consolidation task and the filesystem is not near capacity, it adds it to primary task queue 68; but if filesystem reorganization task 48(x)(y) is a filesystem shrink task and the filesystem is not near capacity, it adds it to secondary task queue 70; reversing if the filesystem is near capacity).

Figure 3:
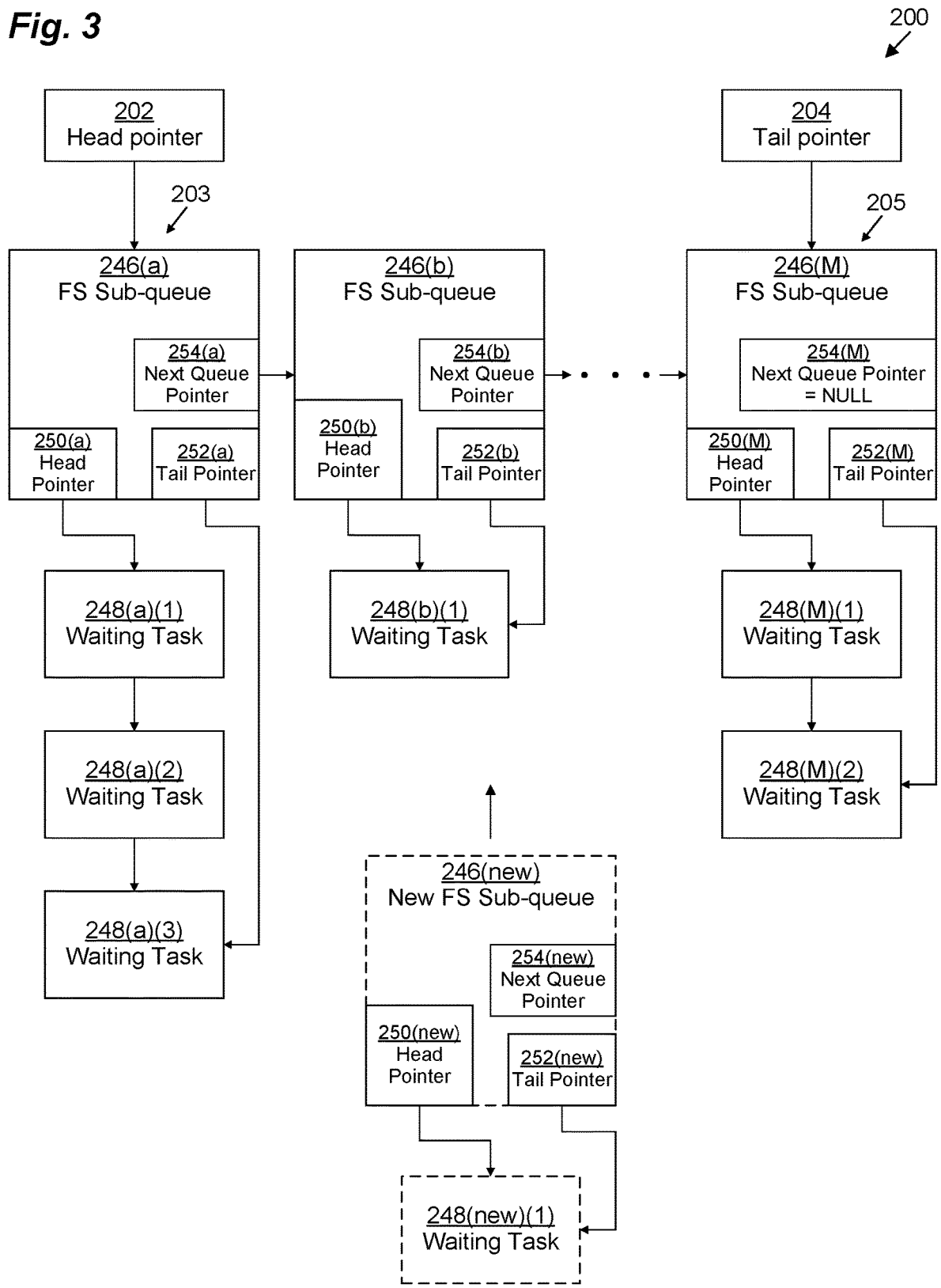
FIG. 3 is a block diagram depicting example data structures for use in connection with various embodiments.

In some embodiments, task scheduler module 61 performs step 150 by performing various sub-steps 151-158 in connection with a specialized queue of queues 200 as illustrated in FIG. 3.

FIG. 3 depicts an example queue 200, which may be a form used for either or both of queues 68, 70.

Queue 200 has a head pointer 202 (pointing to the head 203 of queue 200) and a tail pointer 204 (pointing to the tail 205 of queue 200). Queue 200 also includes a set of primary ordered elements taking the form of filesystem sub-queues 246 (depicted as filesystem sub-queues 246(a), 246(b), . . . , 246(M)). Each filesystem sub-queue 246 represents a different filesystem 46. Each filesystem sub-queue 246 includes a head pointer 250, a tail pointer 252, and a next queue pointer 254. Head pointer 250 points to a first element in an ordered queue of waiting filesystem reorganization tasks 248, and tail pointer 252 points to a last element in the ordered queue of waiting filesystem reorganization tasks 248. Next queue pointer 254 points to a next filesystem sub-queue 246 in queue 200 (NULL in the case of the last filesystem sub-queue 246 in the queue 200).

As depicted, first filesystem sub-queue 246(a) at the head 203 of queue 200 has three queued waiting filesystem reorganization tasks 248(a)(1), 248(a)(2), 248(a)(3) pending execution on a filesystem 46(x) that is uniquely associated with filesystem 246(a). Task 248(a)(1) will be the first task 248(a) to be dequeued from filesystem sub-queue 246(a) if, upon dequeueing, there is an available filesystem-specific token 52(x) in the filesystem-specific token pool 50(x).

Returning to FIG. 2, in sub-step 151, task scheduler module 61 determines whether the filesystem 46(x) on which the filesystem reorganization task 48(x)(y) is supposed to run already has an associated filesystem sub-queue 246(z) on the queue 200 (either queue 68 or 70, as appropriate). If so, operation proceeds to sub-step 152, and, if not, operation proceeds to sub-step 154.

In sub-step 152, task scheduler module 61 appends the filesystem reorganization task 48(x)(y) to the tail of the associated filesystem sub-queue 246(z) as a new waiting task 248(z), updating the tail pointer 252(z) in the process, as is well-known in the art.

In sub-step 154, task scheduler module 61 now needs to create a new filesystem sub-queue 246(new) on the queue 200 associated with the filesystem 46(x). In some embodiments, operation proceeds directly with sub-step 156. In other embodiments, operation proceeds directly with sub-step 158. In other embodiments, as depicted, in sub-step 154, task scheduler module 61 determines whether filesystem 46(x) is currently executing any other filesystem reorganization tasks 48(x) (e.g., by comparing the number of available tokens 52(x) in the available token pool 52(x) to the per-filesystem maximum 62(x) number of filesystem-specific tokens 52(x)). If so, operation proceeds with sub-step 156; otherwise operation proceeds with sub-step 158.

In sub-step 156, task scheduler module 61 creates new filesystem sub-queue 246(new) associated with filesystem 46(z) and adds it to the tail 205 of queue 200 (updating next queue pointer 254(M) and tail pointer 204 to now point to new filesystem sub-queue 246(new)). Task scheduler module 61 also adds the filesystem reorganization task 48(x)(y) to the new filesystem sub-queue 246(new) as its first (and last) element 248(new)(1) pointed to by both the head pointer 250(new) and the tail pointer 252(new).

Alternatively, in sub-step 158, task scheduler module 61 creates new filesystem sub-queue 246(new) associated with filesystem 46(z) and adds it to the head 203 of queue 200 (updating head pointer 202 to now point to new filesystem sub-queue 246(new) and next queue pointer 254(new) to point to filesystem sub-queue 246(a)). Task scheduler module 61 also adds the filesystem reorganization task 48(x)(y) to the new filesystem sub-queue 246(new) as its first (and last) element 248(new)(1) pointed to by both the head pointer 250(new) and the tail pointer 252(new).

Figure 4:
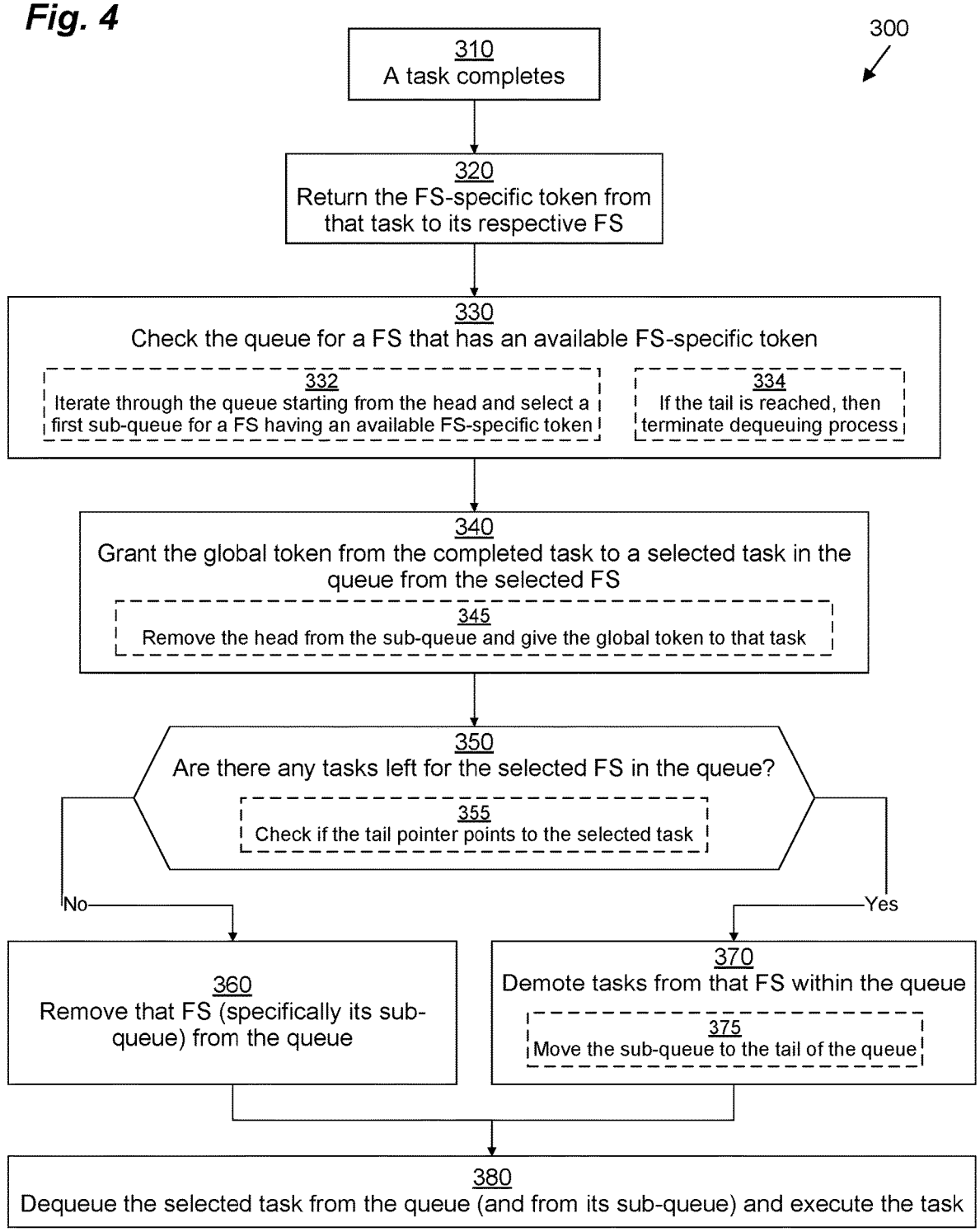
FIG. 4 is a flowchart depicting example methods of various embodiments.

FIG. 4 illustrates an example method 300 performed by dequeuer module 66 of reorganization task manager 60 for selectively dequeueing a filesystem reorganization task 48 from a queue 68, 70. It should be understood that, within FIG. 4, certain steps and sub-steps are drawn with a dashed border because they may be considered optional, depending on the embodiment, or they may represent various alternative scenarios in which method 300 may be employed. In addition, one or more of the other steps or sub-steps of method 300 may also be omitted in some embodiments. Similarly, in some embodiments, one or more steps or sub-steps may be combined together or performed in a different order. Method 300 is performed by DSS device 32. More specifically, method 300 is performed by reorganization task manager 60 (largely by its dequeuer module 66 component) running on DSS device 32 in combination with other components of DSS device 32.

In step 310, a filesystem reorganization task 48(x)(y) running on filesystem 46(x) completes execution. In response, in step 320, reorganization task manager 60 causes filesystem reorganization task 48(x)(y) to return its filesystem-specific token 52(x) to filesystem-specific token pool 50(x) for that filesystem 46(x).

In step 330, dequeuer module 66 checks the queue 68, 70 for a filesystem 46(p) that has an available filesystem-specific token 52(p) in its filesystem-specific token pool 50(p).

In embodiments in which there is only one task queue 68, dequeuer module 66 checks queue 68, and if, it does not find any filesystem 46(p) having an available filesystem-specific token 52(p) in its filesystem-specific token pool 50(p), it terminates method 300. In embodiments in which there are more than one task queues 68, 70, dequeuer module 66 first checks the primary task queue 68, and then, if, it does not find any filesystem 46(p) in primary task queue 68 having an available filesystem-specific token 52(p) of the appropriate type in its filesystem-specific token pool 50(p), it proceeds to check secondary task queues 70 (unless fairness counter 72 indicates that it is time to check a secondary queue 70 first).

In embodiments that use queues 68, 70 structured like queue 200 from FIG. 3, step 330 may be performed by performing sub-steps 332 and 334.

In sub-step 332, dequeuer module 66 iterates through the 200 starting at the head 203 (e.g., by following head pointer 202 to first filesystem sub-queue 246(a)). Dequeuer module 66 first checks the first filesystem sub-queue 246(a) to see if the filesystem 46 with which it is associated has an available filesystem-specific token 52 in its filesystem-specific token pool 50. If it does, then it returns that filesystem 46. Otherwise, it follows pointer 254(a) to the next filesystem sub-queue 246(b), checking and iterating as needed.

In sub-step 334, if no filesystem sub-queue 246 associated with a filesystem 46(p) having an available filesystem-specific token 52(p) in its filesystem-specific token pool 50(p) is found, then, dequeuer module 66 terminates method 300 (or, in embodiments in which there are several queues 68, 70, dequeuer module 66 progresses to the next queue 68, 70, as appropriate).

In step 340, once the filesystem 46(p) having an available filesystem-specific token 52(p) in its filesystem-specific token pool 50(p) is found, dequeuer module 66 grants the global token 56 from the just-completed task 48(x)(y) (see above at step 310) to a task 48(p)(r) from that filesystem 46(p). Dequeuer module 66 also grants the available filesystem-specific token 52(p) from the filesystem-specific token pool 50(p) to that task 48(p)(r).

In embodiments that use queues 68, 70 structured like queue 200 from FIG. 3, the task 48(p)(r) is the top waiting task 248(q)(1) at the head of filesystem sub-queue 246(q) associated with filesystem 46(p) (i.e., as pointed to by head pointer 250(q)), and step 340 includes sub-step 345. In sub-step 345, dequeuer module 66 removes the top waiting task 248(q)(1) at the head of filesystem sub-queue 246(q) from filesystem sub-queue 246(q) (updating head pointer 250(q) and tail pointer 252(q) accordingly).

In step 350, dequeuer module 66 determined whether or not there are any tasks 48(p) left pending for the filesystem 46(p) within the queue 68, 70 from which the task 48(p)(q) was just removed. In embodiments that use queues 68, 70 structured like queue 200 from FIG. 3, this determination may be made by checking if the tail pointer 252(q) had been pointing to the top waiting task 248(q)(1) (or if it is now NULL). If step 350 yields a negative result, then operation proceeds with step 360. Otherwise, operation proceeds with step 370.

In step 360, since there are no more tasks 48(p) left pending for the filesystem 46(p) within the queue 68, 70 from which the task 48(p)(q) was just removed, dequeuer module 66 removes that filesystem 46(p) from the queue 68, 70. In embodiments that use queues 68, 70 structured like queue 200 from FIG. 3, dequeuer module 66 does that by removing its associated filesystem sub-queue 246(q) from the queue 200.

In step 370, since there are still more tasks 48(p) left pending for the filesystem 46(p) within the queue 68, 70 from which the task 48(p)(q) was just removed, filesystem 46(p) remains within the queue 68, 70. However, its tasks 48(p) are demoted to a lower dequeueing priority. In embodiments that use queues 68, 70 structured like queue 200 from FIG. 3, dequeuer module 66 does that performing sub-step 375, in which dequeuer module 66 moves its associated filesystem sub-queue 246(q) from its position the queue 200 to a later position in the queue 200, closer to the tail 205. In one embodiment, dequeuer module 66 moves the associated filesystem sub-queue 246(*q*) to the tail 205 of the queue (updating tail pointer 204 to point to filesystem sub-queue 246(*q*)).

Finally, in step 380, dequeuer module 66 completes the dequeueing operation, and task scheduler module 61 schedules the filesystem reorganization task 48(*p*)(*q*) for execution without delay.

Figure 5:
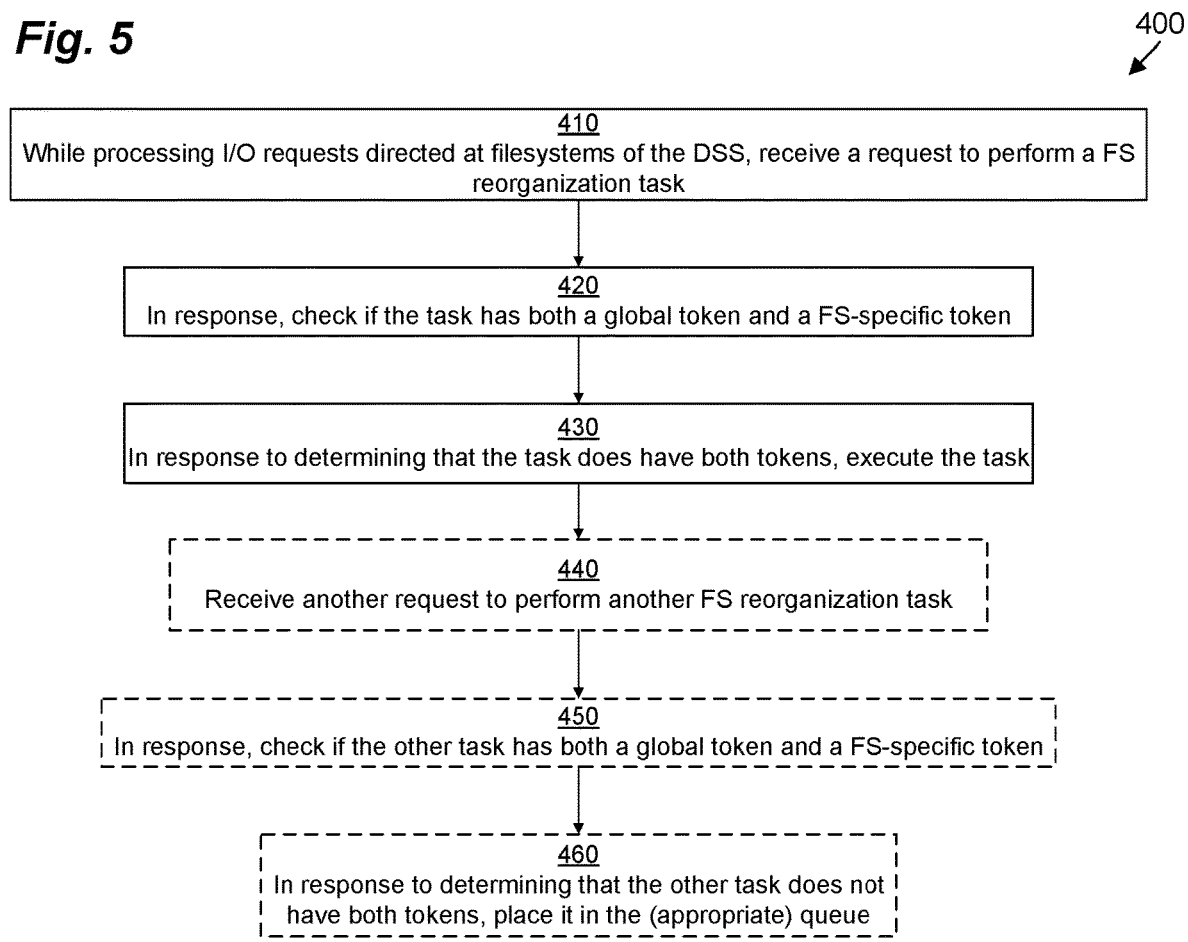
FIG. 5 is a flowchart depicting example methods of various embodiments.

FIG. 5 illustrates an example method 400 performed by DSS device 32. It should be understood that, within FIG. 5, certain steps are drawn with a dashed border because they may be considered optional, depending on the embodiment, or they may represent various alternative scenarios in which method 400 may be employed. In addition, one or more of the other steps of method 400 may also be omitted in some embodiments. Similarly, in some embodiments, one or more steps may be combined together or performed in a different order.

In step 410, as DSS device 32 processes I/O requests 80 directed at filesystems 46 of the DSS device 32, reorganization task manager 60 receives a request to perform a filesystem reorganization task 48(*x*)(*y*) for a given filesystem 46(*x*). In response, in step 420, reorganization task manager 60 checks whether the filesystem reorganization task 48(*x*)(*y*) has both a global token 56 and a filesystem-specific reorganization token 52(*x*).

In response to determining (in step 420) that the filesystem reorganization task 48(*x*)(*y*) indeed does have both a global token 56 and a filesystem-specific reorganization token 52(*x*), reorganization task manager 60 executes the filesystem reorganization task 48(*x*)(*y*) to move a data block from one location within the filesystem 46(*x*) to another location within the filesystem 46(*x*).

In some arrangements, as DSS device 32 continues to process I/O requests 80 directed at filesystems 46 of the DSS device 32, in step 440, reorganization task manager 60 receives another request to perform another filesystem reorganization task 48(*p*)(*q*) for another filesystem 46(*p*). In response, in step 450, reorganization task manager 60 checks whether the other filesystem reorganization task 48(*p*)(*q*) has both a global token 56 and a filesystem-specific reorganization token 52(*p*).

In response to determining (in step 450) that the other filesystem reorganization task 48(*p*)(*q*) does not have both a global token 56 and a filesystem-specific reorganization token 52(*p*), reorganization task manager 60 places the other filesystem reorganization task 48(*p*)(*q*) within a filesystem reorganization task queue 68, 70.

Thus, efficient techniques for efficiently allocating processing resources between filesystem reorganization processes from different filesystems 46 to prevent a slow or greedy filesystem 46 from starving out filesystem reorganization processes on other filesystems 46 have been disclosed. In contrast with prior approaches, improved techniques schedule filesystem reorganization tasks 48 by requiring a filesystem reorganization task 48 to have both a global token 56 and a filesystem-specific token 52 in order to execute. Since each filesystem 46 is only allocated a limited number of filesystem-specific tokens 52 in comparison to the number of global tokens 56, no filesystem 46 can dominate the rest too strongly. Further improvements can dynamically reallocate fewer filesystem-specific tokens 52 to filesystems 46 that are too slow to further prevent starvation of filesystem reorganization processes on other filesystems 46. In addition, a specialized queue 200 and dequeueing procedure 300 can be implemented to allow for fairness in scheduling of filesystem reorganization tasks.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method, performed by a data storage system, the method comprising:

while processing data storage requests from users directed to filesystems of a plurality of filesystems served from the data storage system, receiving a request to execute a filesystem reorganization task on a filesystem of the plurality of filesystems;

in response to receiving the request, checking whether the filesystem reorganization task has both a global reorganization token and a filesystem-specific reorganization token, the filesystem-specific reorganization token being specific to the filesystem on which the filesystem reorganization task has been requested to execute;

in response to determining that the filesystem reorganization task does have both the global reorganization token and the filesystem-specific reorganization token, executing the filesystem reorganization task to move a data block from one location within the filesystem to another location within the filesystem;

while continuing to process data storage requests from users directed to filesystems of the plurality of filesystems, receiving another request to execute another filesystem reorganization task on another filesystem of the plurality of filesystems;

in response to receiving the other request, checking whether the other filesystem reorganization task has both the global reorganization token and a filesystem-specific reorganization token, the filesystem-specific reorganization token being specific to the other filesystem on which the other filesystem reorganization task has been requested to execute; and in response to determining that the other filesystem reorganization task does not have both the global reorganization token and the filesystem-specific reorganization token, placing the other filesystem reorganization task within a filesystem reorganization task queue by placing the other filesystem reorganization task within a particular filesystem reorganization task queue of a plurality of filesystem reorganization task queues based on a type of the other filesystem reorganization task, the plurality of filesystem reorganization task queues having differing relative dequeueing priorities.

2. The method of claim 1 wherein the method further comprises, in response to the filesystem reorganization task completing execution:
- releasing the filesystem-specific reorganization token from that filesystem reorganization task to a pool for the filesystem;
- checking the filesystem reorganization task queue for a waiting filesystem reorganization task whose respective filesystem has a respective pool having an available filesystem-specific reorganization token; and
- in response to finding the waiting filesystem reorganization task, dequeueing the waiting filesystem reorganization task from the filesystem reorganization task queue and executing the waiting filesystem reorganization task to move another data block from one location within its respective filesystem to another location within that filesystem.

3. The method of claim 2 wherein the method further comprises demoting a priority within the filesystem reorganization task queue of other queued filesystem reorganization tasks of the same filesystem as the waiting filesystem reorganization task.

4. The method of claim 3 wherein:
- the filesystem reorganization task queue is a queue having sub-queues as its entries, each sub-queue representing a respective filesystem, each sub-queue being structured as a queue having filesystem reorganization tasks waiting to execute for its respective filesystem as its entries;
- checking the filesystem reorganization task queue for the waiting filesystem reorganization task whose respective filesystem has a respective pool having an available filesystem-specific reorganization token includes:
  - iterating through the filesystem reorganization task queue starting from a head of the filesystem reorganization task queue, checking the respective filesystem of each sub-queue as the iteration progresses to determine if that filesystem has a respective pool having an available filesystem-specific reorganization token; and
  - upon finding a filesystem whose respective pool has an available filesystem-specific reorganization token, selecting a filesystem reorganization task at a head of the respective sub-queue for that filesystem as the waiting filesystem reorganization task; and
- demoting the priority within the filesystem reorganization task queue of other queued filesystem reorganization tasks of the same filesystem as the waiting filesystem reorganization task includes moving the respective sub-queue for that filesystem to a tail of the filesystem reorganization task queue.

5. The method of claim 1 wherein:
- the filesystem reorganization task queue is a queue having sub-queues as its entries, each sub-queue representing a respective filesystem, each sub-queue being structured as a queue having filesystem reorganization tasks waiting to execute for its respective filesystem as its entries;
- placing the other filesystem reorganization task within the filesystem reorganization task queue includes:
  - iterating through the filesystem reorganization task queue starting from a head of the filesystem reorganization task queue, checking the whether the respective filesystem of each sub-queue is the other filesystem as the iteration progresses; and
  - upon finding a sub-queue within the filesystem reorganization task queue having the other filesystem as its respective filesystem, inserting the other filesystem reorganization task at a tail of that sub-queue.

6. The method of claim 1 wherein:
- the filesystem reorganization task queue is a queue having sub-queues as its entries, each sub-queue representing a respective filesystem, each sub-queue being structured as a queue having filesystem reorganization tasks waiting to execute for its respective filesystem as its entries;
- placing the other filesystem reorganization task within the filesystem reorganization task queue includes:
  - iterating through the filesystem reorganization task queue starting from a head of the filesystem reorganization task queue, checking the whether the respective filesystem of each sub-queue is the other filesystem as the iteration progresses; and
  - upon iterating through the entire filesystem reorganization task queue without finding a sub-queue within the filesystem reorganization task queue having the other filesystem as its respective filesystem:
    - adding a new sub-queue within the filesystem reorganization task queue associated with the other filesystem; and
    - inserting the other filesystem reorganization task into the new sub-queue.

7. The method of claim 6 wherein adding the new sub-queue within the filesystem reorganization task queue associated with the other filesystem includes:
- determining whether any filesystem reorganization tasks are currently executing for the other filesystem; and
- in response to determining that no filesystem reorganization tasks are currently executing for the other filesystem, adding the new sub-queue at the head of the filesystem reorganization task queue.

8. The method of claim 6 wherein adding the new sub-queue within the filesystem reorganization task queue associated with the other filesystem includes:
- determining whether any filesystem reorganization tasks are currently executing for the other filesystem; and
- in response to determining that at least one filesystem reorganization task is currently executing for the other filesystem, adding the new sub-queue at a tail of the filesystem reorganization task queue.

9. The method of claim 1 wherein the method further comprises adjusting the relative dequeueing priorities of the plurality of filesystem reorganization task queues based on data storage needs of the data storage system.

10. The method of claim 1 wherein the data storage system has a fixed number of global reorganization tokens, and each filesystem of the plurality of filesystems has a respective number of filesystem-specific reorganization tokens.

11. The method of claim 10 wherein the method further comprises adjusting the number of filesystem-specific reorganization tokens for the various filesystems during operation.

12. The method of claim 11 wherein adjusting the number of filesystem-specific reorganization tokens for the various filesystems during operation includes, for a particular filesystem of the plurality of filesystems:
- computing an adjustment based on a current measure of how busy the particular filesystem is and a previous measure of how busy the particular filesystem was at a previous time; and
- altering the number of filesystem-specific reorganization tokens for the particular filesystem using the computed adjustment.

13. The method of claim 11 wherein adjusting the number of filesystem-specific reorganization tokens for the various filesystems during operation includes, for a particular filesystem of the plurality of filesystems, assigning the number of filesystem-specific reorganization tokens for that particular filesystem based on a measured latency in data storage operations for that particular filesystem.

14. An apparatus comprising:
non-transitory persistent storage devices providing data storage;
network interface circuitry configured to communicate with a host over a network; and
processing circuitry coupled to memory to form a control circuit configured to:
while processing data storage requests from users directed to filesystems of a plurality of filesystems served from the data storage, receive a request to execute a filesystem reorganization task on a filesystem of the plurality of filesystems;
in response to receiving the request, check whether the filesystem reorganization task has both a global reorganization token and a filesystem-specific reorganization token, the filesystem-specific reorganization token being specific to the filesystem on which the filesystem reorganization task has been requested to execute;
in response to determining that the filesystem reorganization task does have both the global reorganization token and the filesystem-specific reorganization token, execute the filesystem reorganization task to move a data block from one location within the filesystem to another location within the filesystem;
while continuing to process data storage requests from users directed to filesystems of the plurality of filesystems, receive another request to execute another filesystem reorganization task on another filesystem of the plurality of filesystems;
in response to receiving the other request, check whether the other filesystem reorganization task has both the global reorganization token and a filesystem-specific reorganization token, the filesystem-specific reorganization token being specific to the other filesystem on which the other filesystem reorganization task has been requested to execute; and
in response to determining that the other filesystem reorganization task does not have both the global reorganization token and the filesystem-specific reorganization token, place the other filesystem reorganization task within a filesystem reorganization task queue by placing the other filesystem reorganization task within a particular filesystem reorganization task queue of a plurality of filesystem reorganization task queues based on a type of the other filesystem reorganization task, the plurality of filesystem reorganization task queues having differing relative dequeueing priorities.

15. A computer program product comprising a non-transitory computer-readable storage medium storing a set of instructions, which, when executed by control circuitry of a data storage system, cause the control circuitry to:
while processing data storage requests from users directed to filesystems of a plurality of filesystems served from the data storage system, receive a request to execute a filesystem reorganization task on a filesystem of the plurality of filesystems;
in response to receiving the request, check whether the filesystem reorganization task has both a global reorganization token and a filesystem-specific reorganization token, the filesystem-specific reorganization token being specific to the filesystem on which the filesystem reorganization task has been requested to execute;
in response to determining that the filesystem reorganization task does have both the global reorganization token and the filesystem-specific reorganization token, execute the filesystem reorganization task to move a data block from one location within the filesystem to another location within the filesystem;
while continuing to process data storage requests from users directed to filesystems of the plurality of filesystems, receive another request to execute another filesystem reorganization task on another filesystem of the plurality of filesystems;
in response to receiving the other request, check whether the other filesystem reorganization task has both the global reorganization token and a filesystem-specific reorganization token, the filesystem-specific reorganization token being specific to the other filesystem on which the other filesystem reorganization task has been requested to execute; and
in response to determining that the other filesystem reorganization task does not have both the global reorganization token and the filesystem-specific reorganization token, place the other filesystem reorganization task within a filesystem reorganization task queue by placing the other filesystem reorganization task within a particular filesystem reorganization task queue of a plurality of filesystem reorganization task queues based on a type of the other filesystem reorganization task, the plurality of filesystem reorganization task queues having differing relative dequeueing priorities.

* * * * *